Sept. 15, 1931.  H. A. FOSTER  1,823,732
FLOWER VASE
Filed Jan. 19, 1928
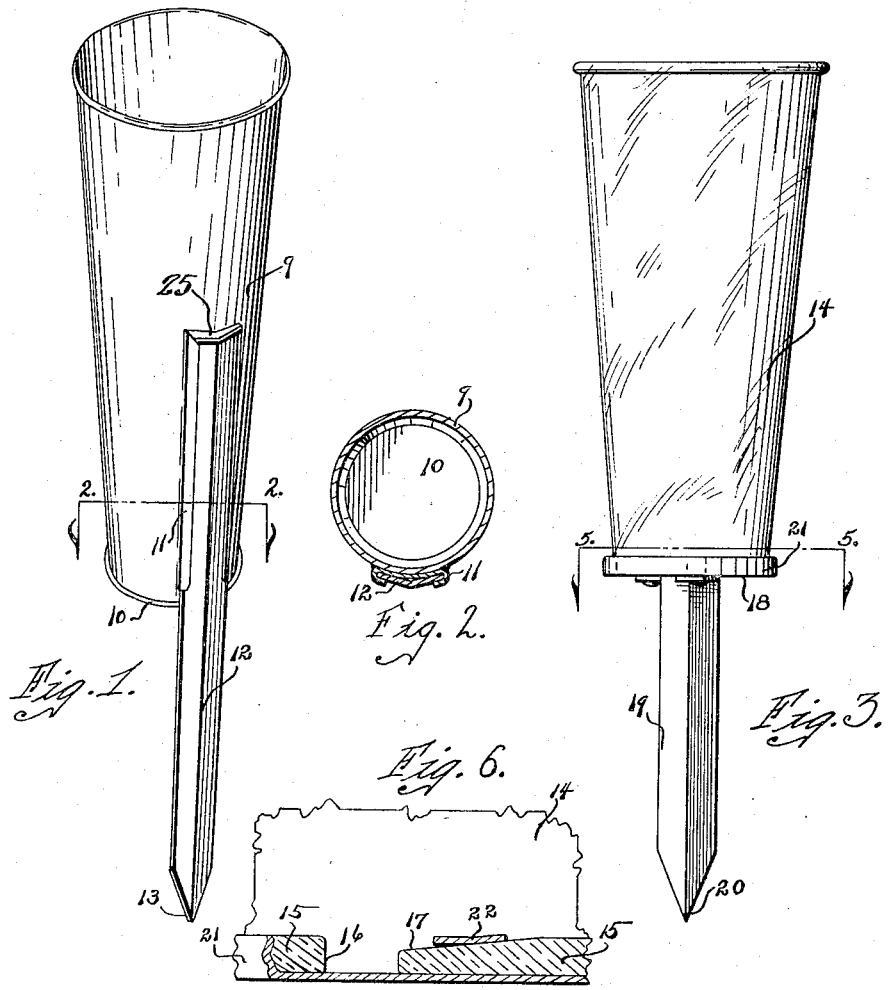
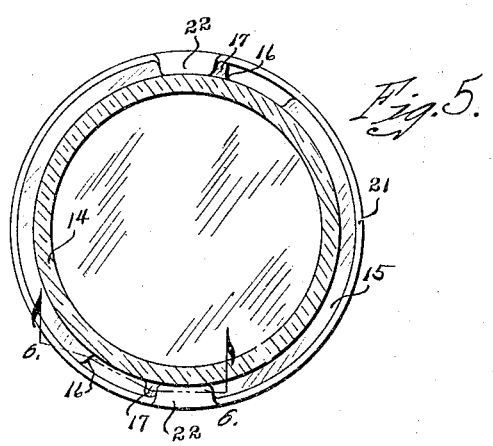
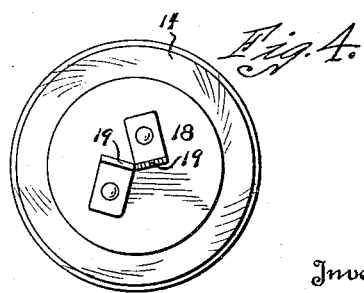
Inventor
H·A·FOSTER
By M. Talbert Pick
Attorney Patented Sept. 15, 1931

1,823,732

UNITED STATES PATENT OFFICE

HENRY A. FOSTER, OF DES MOINES, IOWA

FLOWER VASE

Application filed January 19, 1928. Serial No. 247,823.

The principal object of this invention is to provide a flower vase for lawns, cemeteries, and the like.

A further object of this invention is to provide a flower vase for lawns and the like that may be used without damage to the grass.

A further object is to provide a lawn or cemetery vase that is securely held in the ground and not affected by winds.

A still further object of this invention is to provide a flower vase for lawns and the like that is easily detached from or attached to its spike, in order to facilitate the ready removal of the vase and flowers to a place of safety, on freezing nights or to refill the same with flowers.

A still further object is to provide a lawn or cemetery vase that is economical in manufacture and durable in use.

These and other objects will be understood by those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a perspective view of one form of my vase, ready for use.

Fig. 2 is a cross sectional view of the same vase taken on line 2—2 of Fig. 1 and illustrates the detachable securing of the spike or blade to the vase.

Fig. 3 is a side view of a different form of structure of my vase ready for use.

Fig. 4 is a cross sectional view of the base of the vase and more fully illustrates the spike or blade of the base.

Fig. 5 is a cross sectional view of my vase taken on line 5—5 of Fig. 3 and illustrates the manner of securing the vase to the supporting base portion.

Fig. 6 is a side sectional view of my vase taken on line 6—6 of Fig. 5 and more fully illustrates the manner of attaching the vase to the supporting base portion.

The lawn or cemetery vases now on the market are cone-shaped and are placed in the ground by forcing the pointed end into the same. This procedure displaces much earth and when the vase is removed, not only is a hole left in the ground, but the lawn has been ruined at that place. By being cone-shaped, it cannot be set upright on a table or shelf and because of its undefined bottom, the flowers are not held in proper or artistic positions. I have overcome all of these objections, as will be appreciated by those skilled in the art.

In the construction illustrated in Fig. 1, I have designated the vase portion of the device by the numeral 9. This vase tapers inwardly toward its flat bottom 10. Secured by suitable means to the lower portion of the vase 9, is the dove-tailed groove member 11, which may be made of a single piece of suitable metal by having its two vertical edges bent back upon itself, as shown in Fig. 2 and its top portion bent outwardly to form a stop 25, as shown in Fig. 1. The numeral 12 designates a spike or blade designed to have its blunt end inserted in the dove-tailed groove member 11, as shown in Fig. 1. By this construction, it may easily be attached or detached from the vase, thereby facilitating the packing and shipping of the vase, as well as making it possible to remove the vase from the spike when the same is in the ground, without withdrawing the spike from the ground, the advantage of which will readily be appreciated. The spike may be of flat form or it may be slightly curved to conform to the vase. To facilitate the placing of the spike in the earth, its free end is pointed and designated by the numeral 13. When this design of vase is used, the base is preferably made of galvanized iron or other suitable metal.

In Fig. 3, I show a slightly different form of construction. In this construction I have designated the vase by the numeral 14 which may be made of either glass or metal. On the bottom portion of the vase 14 is formed an outwardly extending flange 15 having notches or cut away portions 16. This peripheral flange adjacent one side of each of these notches tapers upwardly, as shown in Fig. 6, which I have designated by the numeral 17, the purpose of which will hereinafter be understood. I have designated the supporting base portion proper of this construction by the numeral 18, having secured by suitable means to its bottom, the blade or spike 19 having its free end pointed and designated by the numeral 20. The numeral 21 designates an upwardly extending peripheral flange on the portion 18 designed to embrace the lower portion of the vase 14, as shown in Fig. 3. The numeral 22 designates inwardly extending lugs integrally formed on the upper marginal edge of the peripheral flange 21. By this construction, the vase is placed upon the supporting base member in such a manner that the lugs 22 register with the cut away portion 16 in the peripheral flange of the vase 14. By rotating the vase slightly to the right, these lugs 22 will pass upon the inclining portions 17 of the peripheral flange 15, as shown in Fig. 6, thereby securely attaching the vase 14 to its supporting base portion. By rotating the vase slightly to the left, the lugs 22 will again register with the cut away portions 16, thereby permitting the vase to be withdrawn from the supporting base portion.

In placing either of the constructions shown, in the ground, the spike or blade should only be forced into the earth to such an extent that the bottom of the vase or base portion 18 is some distance above the surface of the ground. This permits the grass to grow unmolested, beneath the bottom of the vase. If the vase and spike are removed, no noticeable hole is left in the ground. By the spike being of flat or curved form, the vase is not susceptible to being turned by the wind. When either of the constructions shown is used, the vase may be easily attached to or removed from the spike portion, thereby permitting the vase and flowers to be readily removed when desired.

Although I have described by vase for the holding of flowers, it may be successfully used for growing plants and when this is done, it is suggested that holes be formed in the bottom of the vase, as is common in containers of this nature.

It will readily be appreciated by those familiar with the art, that I have provided a vase that may be used on any lawn or cemetery without harm to the grass.

Some changes may be made in the construction and arrangement of my improved flower vase without departing from the real spirit and purpose of my invention and it is my intention to cover by my claims, any modified forms of structure or use of mechanical equivalents which may be reasonably included within their scope.

I claim:

In a device of the class described, a vase, a dove-tailed groove member secured on the side of said vase, a stop member for enclosing the top of said dove-tailed groove, and a flat spike member having one of its ends capable of entering said groove and engaging said stop and its other end designed to be inserted in the ground.

HENRY A. FOSTER.